United States Patent
Tsubouchi et al.

(10) Patent No.: US 11,454,431 B2
(45) Date of Patent: Sep. 27, 2022

(54) IN-VEHICLE ABSORPTION HEAT PUMP DEVICE

(71) Applicant: AISIN CORPORATION, Kariya (JP)

(72) Inventors: Osamu Tsubouchi, Kariya (JP); Taketsugu Toyoda, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 17/133,791

(22) Filed: Dec. 24, 2020

(65) Prior Publication Data

US 2021/0215407 A1 Jul. 15, 2021

(30) Foreign Application Priority Data

Jan. 14, 2020 (JP) .............................. JP2020-003524

(51) Int. Cl.
*F25B 30/04* (2006.01)
(52) U.S. Cl.
CPC .................................... *F25B 30/04* (2013.01)
(58) Field of Classification Search
CPC .......................... F25B 30/04; B60H 1/32011
See application file for complete search history.

(56) References Cited

U.S. PATENT DOCUMENTS

2015/0168029 A1   6/2015 Tsubouchi
2019/0184334 A1*  6/2019 Moghaddam ........... F25B 15/02

FOREIGN PATENT DOCUMENTS

| JP | 2014048010 A | 3/2014 | |
| JP | 6264013 B2 | 1/2018 | |
| JP | 2018197094 A | 12/2018 | |
| KR | 101773864 | * 9/2017 | ............. F25B 37/00 |
| WO | WO-2013008393 A1 | * 1/2013 | ......... B60H 1/00899 |

OTHER PUBLICATIONS

KR 101773864 Translation (Year: 2017).*
WO-2013008393-A1 Translation (Year: 2013).*

* cited by examiner

*Primary Examiner* — David J Teitelbaum
(74) *Attorney, Agent, or Firm* — Buchanan Ingersoll & Rooney PC

(57) ABSTRACT

An in-vehicle absorption heat pump device includes: a regenerator including a gas-liquid separation unit that separates a diluted absorbent containing a refrigerant into the refrigerant and a concentrated absorbent separated from the diluted absorbent; a condenser that condenses a refrigerant vapor separated from the diluted absorbent in the gas-liquid separation unit; an evaporator that evaporates the refrigerant condensed in the condenser; an absorber that causes the refrigerant evaporated by the evaporator to be absorbed into the concentrated absorbent separated from the diluted absorbent in the gas-liquid separation unit; and a storage tank that stores both the diluted absorbent discharged from the absorber and the refrigerant discharged from the evaporator. The storage tank is integrally provided below both the absorber and the evaporator, and communicates with both the absorber and the evaporator.

6 Claims, 6 Drawing Sheets

ENLARGED SECTIONAL VIEW OF PART A

IN-VEHICLE ABSORPTION HEAT PUMP DEVICE

CROSS REFERENCE TO RELATED APPLICATIONS

This application is based on and claims priority under 35 U.S.C. § 119 to Japanese Patent Application 2020-003524, filed on Jan. 14, 2020, the entire content of which is incorporated herein by reference.

TECHNICAL FIELD

This disclosure relates to an in-vehicle absorption heat pump device, and more particularly relates to an in-vehicle absorption heat pump device including an evaporator and an absorber.

BACKGROUND DISCUSSION

In the related art, an in-vehicle absorption heat pump device including an evaporator and an absorber is known (for example, refer to JP 2018-197094A).

JP 2018-197094A discloses the in-vehicle absorption heat pump device including the evaporator and the absorber. In addition, the in-vehicle absorption heat pump device includes a regenerator, a condenser, a circulation pump, an absorbent storage tank, and a supply pump.

The regenerator disclosed in JP 2018-197094A includes a gas-liquid separation unit that separates a diluted absorbent containing a refrigerant into a refrigerant and a concentrated absorbent. The condenser is configured to condense the refrigerant vapor separated in the gas-liquid separation unit into the refrigerant. The evaporator is configured to evaporate the refrigerant condensed in the condenser. The absorber is configured to generate the diluted absorbent by absorbing the refrigerant vapor evaporated in the evaporator into the concentrated absorbent separated in the gas-liquid separation unit. The circulation pump is configured so that the concentrated absorbent separated in the gas-liquid separation unit is circulated inside the regenerator.

The absorbent storage tank disclosed in JP 2018-197094A is configured to temporarily store the diluted absorbent generated in the absorber. The absorbent storage tank is provided separately from the absorber, below the absorber. The absorbent storage tank communicates with the absorber.

In the in-vehicle absorption heat pump device disclosed in JP 2018-197094A, when the concentrated absorbent inside the gas-liquid separation unit is mixed with the refrigerant condensed in the condenser and flows into the evaporator as it is, the concentrated absorbent remains in the evaporation without being evaporated. Accordingly, an evaporation amount of the refrigerant in the evaporator decreases. In this case, it is conceivable that performance of the evaporator may be degraded. Therefore, in the in-vehicle absorption heat pump device disclosed in JP 2018-197094A, the concentrated absorbent mixed with the refrigerant is discharged to the regenerator by the supply pump.

However, in the in-vehicle absorption heat pump device disclosed in JP 2018-197094A, in order to ensure the performance of the evaporator, a drive source such as the supply pump is provided. Consequently, there is a disadvantage in that a size of the device increases. Therefore, in the in-vehicle absorption heat pump device in the related art disclosed in JP 2018-197094A, it is desirable to ensure the performance of the evaporator while decreasing the size of the device.

A need thus exists for an in-vehicle absorption heat pump device which is not susceptible to the drawback mentioned above.

SUMMARY

An in-vehicle absorption heat pump device according to an aspect of this disclosure includes a regenerator including a gas-liquid separation unit that separates a diluted absorbent containing a refrigerant into the refrigerant and a concentrated absorbent separated from the diluted absorbent, a condenser that condenses a refrigerant vapor separated from the diluted absorbent in the gas-liquid separation unit, an evaporator that evaporates the refrigerant condensed in the condenser, an absorber that causes the refrigerant evaporated by the evaporator to be absorbed into the concentrated absorbent separated from the diluted absorbent in the gas-liquid separation unit, and a storage tank that stores both the diluted absorbent discharged from the absorber and the refrigerant discharged from the evaporator. The storage tank is integrally provided below both the absorber and the evaporator, and communicates with both the absorber and the evaporator.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment disclosed here will be described with reference to the drawings.

A configuration of an in-vehicle absorption heat pump device 100 provided in a vehicle engine will be described with reference to FIGS. 1 to 8.

Figure 1:
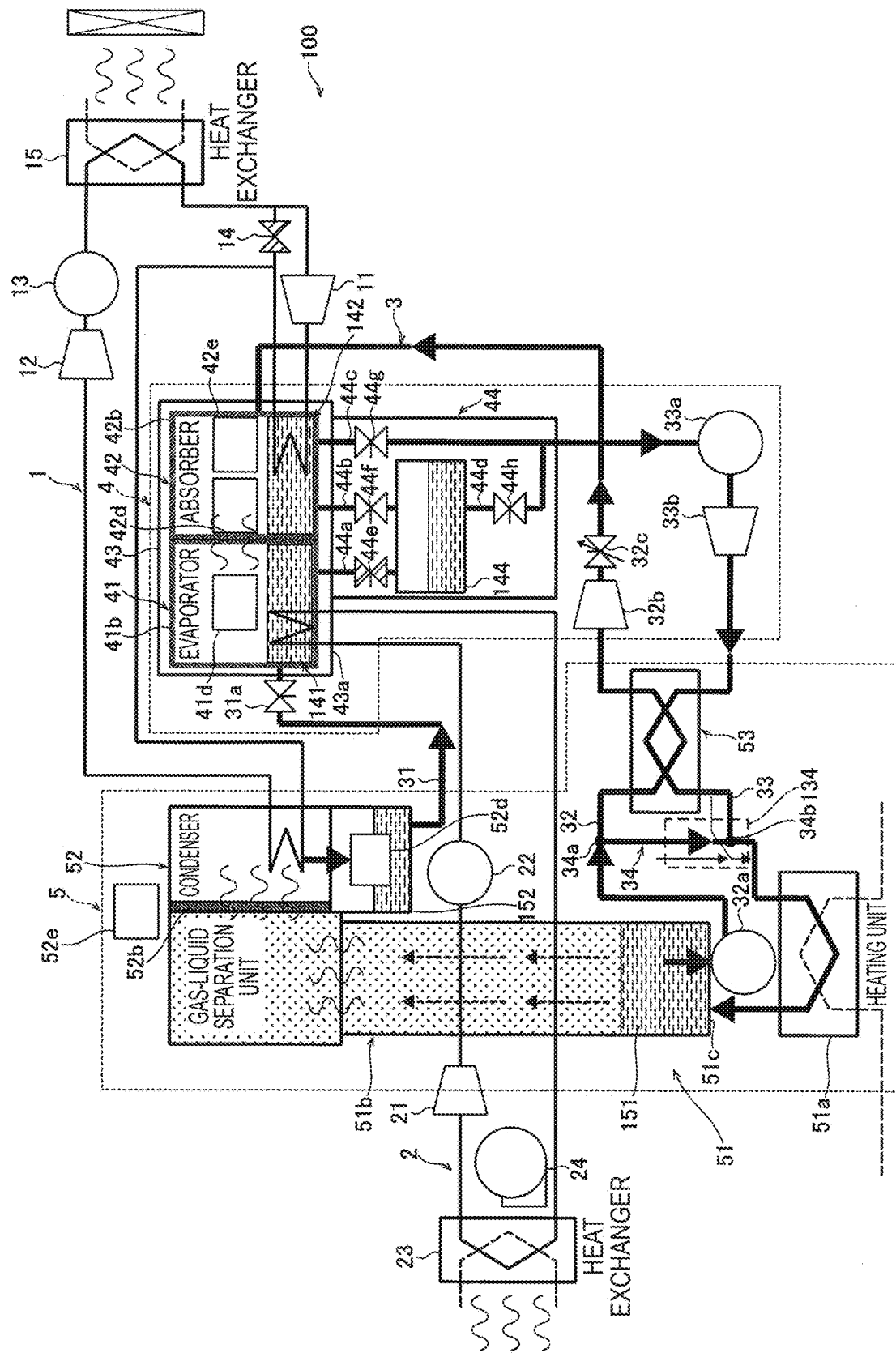
FIG. 1 is an overall view illustrating an in-vehicle absorption heat pump device according to an embodiment.
Figure 2:
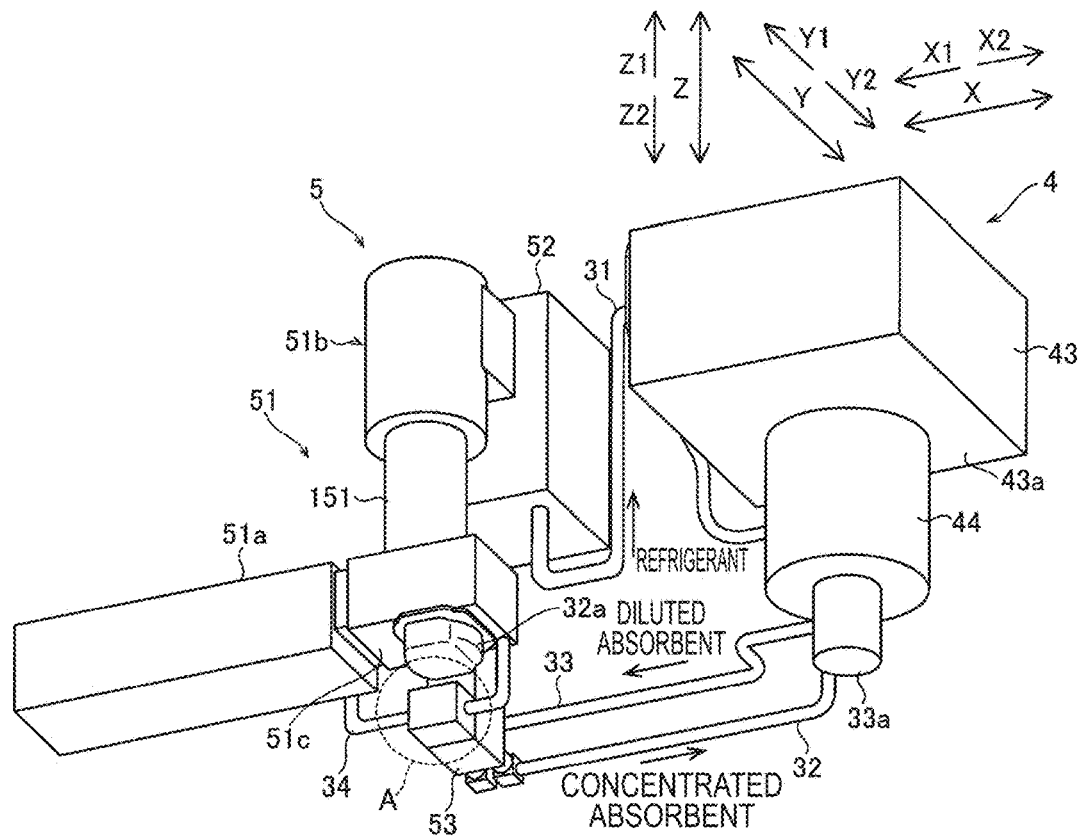
FIG. 2 is a perspective view when a regenerator, a condenser, a gas-liquid separation unit, and an absorption evaporator container in the in-vehicle absorption heat pump device according to the embodiment are viewed from a side in a Y1-direction.

As illustrated in FIGS. 1 and 2, in the in-vehicle absorption heat pump device 100, water is used as a refrigerant, and an aqueous solution of lithium bromide (LiBr) is used as an absorbent. In addition, the in-vehicle absorption heat pump device 100 is mounted on a vehicle such as a passenger car, a bus, and a truck which are equipped with an engine, and is configured to be applied to an in-vehicle air conditioning system.

Specifically, the in-vehicle absorption heat pump device 100 includes a first cooling water circuit unit 1 (an example of a "cooling water circuit" in the appended claims), a second cooling water circuit unit 2, a main body circuit unit 3, an evaporation absorption unit 4 including an evaporator 41 and an absorber 42, and a regeneration condensation unit 5 including a regenerator 51, a condenser 52, and a heat exchanger 53. In FIG. 1, a flow passage through which cooling water flows is illustrated by a thin line, and a flow passage through which a concentrated absorbent, a diluted absorbent, and a refrigerant flow is illustrated by a thick line.

Here, a direction in which the evaporation absorption unit 4 and the regeneration condensation unit 5 face each other will be referred to as an X-direction, a direction from the evaporation absorption unit 4 to the regeneration condensation unit 5 will be referred to as an X1-direction, and a direction opposite thereto will be referred to as an X2-direction. In addition, an upward-downward direction will be referred to as a Z-direction, an upward direction will be referred to as a Z1-direction, and a downward direction will be referred to as a Z2-direction. Directions orthogonal to the X-direction and the Z-direction will be referred to as a Y-direction, one direction will be referred to as a Y1-direction, and the other direction will be referred to as a Y2-direction. In addition, a horizontal direction will be referred to as an XY-direction.

As illustrated in FIG. 1, the first cooling water circuit unit 1 and the second cooling water circuit unit 2 are circulation pipeline units through which cooling water flows. The first cooling water circuit unit 1 and the second cooling water circuit unit 2 are configured to be driven during a cooling operation.

The first cooling water circuit unit 1 is configured to cause the cooling water to flow through the absorber 42 and the condenser 52 during the cooling operation. That is, the first cooling water circuit unit 1 removes absorbed heat generated when a refrigerant (low temperature water vapor) in the absorber 42 is absorbed into a concentrated absorbent, and cools (liquefies) a refrigerant vapor (high temperature water vapor) in the absorber 42 and the condenser 52 during the cooling operation.

Specifically, the first cooling water circuit unit 1 includes an upstream flowmeter 11, a downstream flowmeter 12, a pump 13, a switching valve 14, and a heat exchanger 15 (cooler). The upstream flowmeter 11 measures a flow rate of the cooling water flowing from the heat exchanger 15 to the absorber 42. The downstream flowmeter 12 measures a flow rate of the cooling water flowing from the condenser 52 to the heat exchanger 15. The pump 13 circulates the cooling water inside the first cooling water circuit unit 1. The switching valve 14 is configured to short-circuit a flow passage of the cooling water flowing from the heat exchanger 15 to the absorber 42 to a flow passage of the cooling water flowing from the heat exchanger 15 to the condenser 52. The heat exchanger 15 is configured to cool the cooling water inside the first cooling water circuit unit 1 by heat exchange with external air.

The second cooling water circuit unit 2 is configured to cause the cooling water to flow through the evaporator 41 during the cooling operation. That is, the second cooling water circuit unit 2 cools the cooling water inside the second cooling water circuit unit 2 by applying heat (heat absorption) to the refrigerant inside the evaporator 41 (low temperature and low pressure).

Specifically, the second cooling water circuit unit 2 includes an evaporator flowmeter 21, a pump 22, a heat exchanger 23, and a blower 24. The evaporator flowmeter 21 measures a flow rate of the cooling water flowing from the heat exchanger 23 to the evaporator 41. The pump 22 circulates the cooling water inside the second cooling water circuit unit 2. The heat exchanger 23 is configured to cool external air by heat exchange between the external air and the cooling water inside the second cooling water circuit unit 2. The blower 24 is configured to blow air to the heat exchanger 23.

As illustrated in FIG. 1, the concentrated absorbent, the diluted absorbent, and the refrigerant flow through the main body circuit unit 3. Here, the regeneration condensation unit 5 and the evaporation absorption unit 4 are disposed in the main body circuit unit 3. In this way, the main body circuit unit 3 is configured to circulate the concentrated absorbent, the diluted absorbent, and the refrigerant through the evaporator 41, the absorber 42, the regenerator 51, and the condenser 52.

Specifically, the main body circuit unit 3 includes a refrigerant supply pipeline portion 31, a first absorbent pipeline portion 32 (an example of a "first flow passage" in the appended claims), a second absorbent pipeline portion 33 (an example of a "third flow passage" in the appended claims), and a branch pipeline portion 34 (an example of a "second flow passage" in the appended claims).

The refrigerant supply pipeline portion 31 (refer to FIG. 2) connects the condenser 52 and the evaporator 41 to each other. The refrigerant supply pipeline portion 31 is configured to supply the refrigerant condensed (liquefied) by the condenser 52 to the evaporator 41. An electromagnetic valve 31a is disposed in the refrigerant supply pipeline portion 31. The electromagnetic valve 31a adjusts a flow rate of the refrigerant supplied from the condenser 52 to the evaporator 41.

The first absorbent pipeline portion 32 (refer to FIG. 3) connects a gas-liquid separation unit 51b (to be described later) of the regenerator 51 and the absorber 42 to each other. The first absorbent pipeline portion 32 is configured to cause the concentrated absorbent separated from the diluted absorbent by the gas-liquid separation unit 51b to flow to the absorber 42. A pump 32a, a flowmeter 32b, and an electromagnetic valve 32c are disposed in the first absorbent pipeline portion 32. The pump 32a causes the concentrated absorbent to flow from the gas-liquid separation unit 51b to the absorber 42. The flowmeter 32b measures a flow rate of the first absorbent pipeline portion 32. The electromagnetic valve 32c adjusts a flow rate of the concentrated absorbent supplied from the gas-liquid separation unit 51b to the absorber 42.

The second absorbent pipeline portion 33 (refer to FIGS. 2 and 3) connects the evaporation absorption unit 4 and the regenerator 51 to each other. The second absorbent pipeline portion 33 is configured to cause the diluted absorbent absorbing the refrigerant in the absorber 42 of the evaporation absorption unit 4 to flow to the branch pipeline portion 34. A pump 33a and a flowmeter 33b are disposed in the second absorbent pipeline portion 33. The pump 33a causes the diluted absorbent flowing out from the evaporation absorption unit 4 to flow to the regenerator 51. The flowmeter 33b measures a flow rate of the second absorbent pipeline portion 33.

The branch pipeline portion 34 branches from the first absorbent pipeline portion 32, and merges with the second absorbent pipeline portion 33, thereby connecting the first absorbent pipeline portion 32 and the second absorbent pipeline portion 33 to each other.

More specifically, an upstream end portion of the branch pipeline portion 34 is a branch portion 34a (an example of a "branch portion to the second flow passage" in the appended claims) branching from the first absorbent pipeline portion 32. A downstream end portion of the branch pipeline portion 34 is a merging portion 34b (an example of a "merging portion with the third flow passage" in the appended claims) merging with the second absorbent pipeline portion 33. The branch pipeline portion 34 branches from the first absorbent pipeline portion 32, and is configured to cause the concentrated absorbent separated in the gas-liquid separation unit 51b to flow to a heating unit 51a of the regenerator 51 (to be described later). In this manner, the concentrated absorbent is circulated inside the regenerator 51.

Evaporation Absorption Unit

Figure 4:
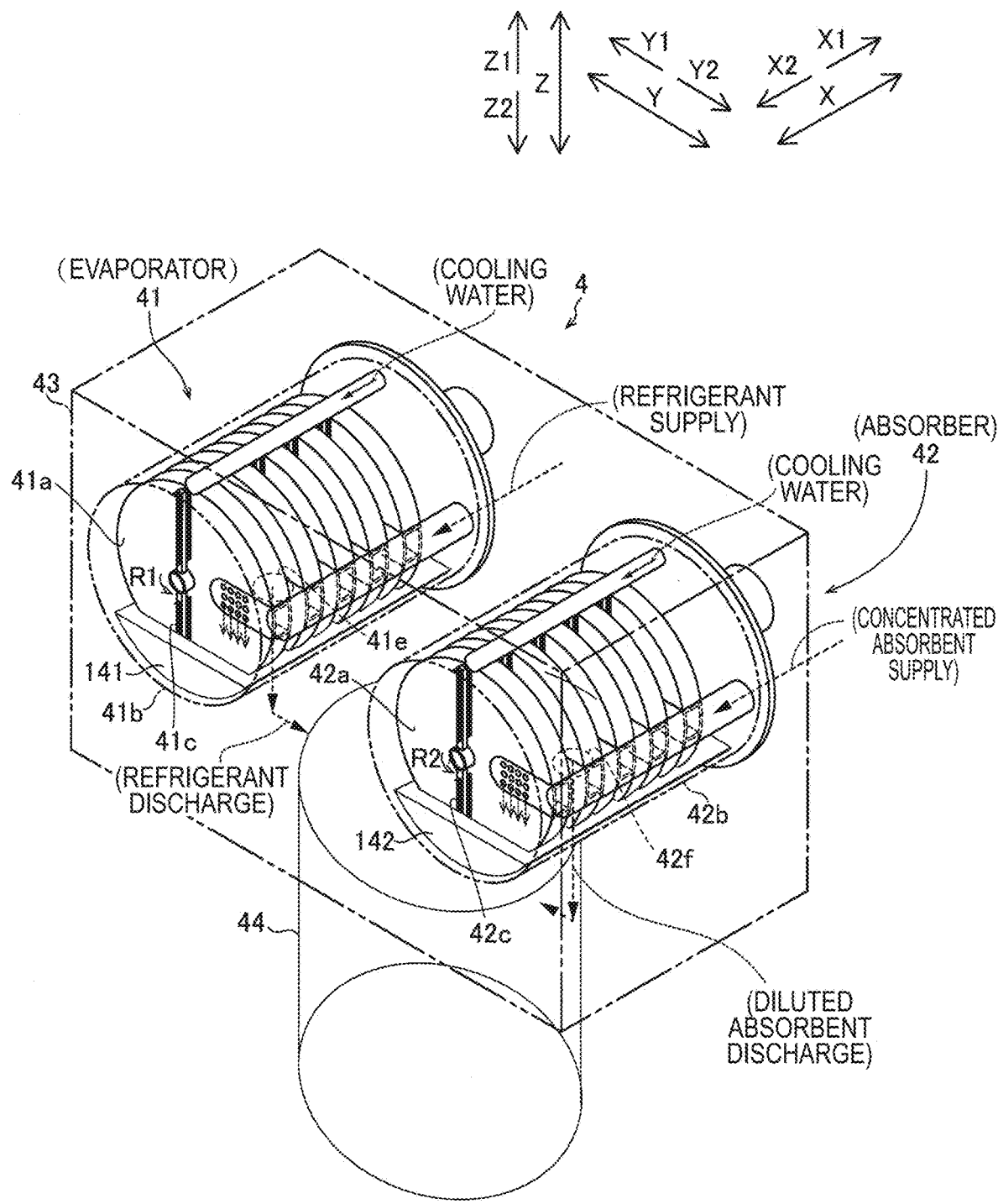
FIG. 4 is a perspective view illustrating an evaporator and an absorber inside the absorption evaporator container in the in-vehicle absorption heat pump device according to the embodiment.

As illustrated in FIGS. 1 and 4, the evaporation absorption unit 4 of the present embodiment is a unit in which the evaporator 41, the absorber 42, and an absorbent storage tank 44 are integrally provided. Specifically, the evaporation absorption unit 4 includes the evaporator 41, the absorber 42, the absorption evaporator container 43, and the absorbent storage tank 44 (an example of a "storage tank" in the appended claims).

Evaporator

The evaporator 41 is configured to evaporate the refrigerant condensed in the condenser 52. That is, the evaporator 41 is configured to evaporate (vaporize) the refrigerant condensed in the condenser 52 under conditions of a low temperature and a low pressure during the cooling operation.

Specifically, the evaporator 41 includes a heat exchanger 41a, a membrane member 41b, a spin coating body 41c, a motor (not illustrated), and a liquid level measurement unit 41d.

The heat exchanger 41a is configured to exchange heat between the refrigerant supplied from the condenser 52 and the cooling water. The heat exchanger 41a has a heat transfer pipe (not illustrated) through which cooling water flows. A plurality (five) heat exchangers 41a are disposed to be aligned in the X-direction. The number of heat exchangers 41a may be one to four, and six or more.

The membrane member 41b covers and surrounds the heat exchanger 41a, and is configured to cause the refrigerant vapor to be permeable without causing the refrigerant to be permeable. As a result, a refrigerant storage unit 141 in which the refrigerant is stored is formed in the lower portion of the membrane member 41b. The membrane member 41b covers the structure in which the heat exchanger 41a and the spin coating body 41c are integrated to surround the integrated structure. In addition, the inside of the membrane member 41b is held in a low-pressure vacuum state in order to evaporate the refrigerant by the cooling water. An outflow port 41e is formed in a portion (lower portion) of the membrane member 41b on the side in the Z2-direction to allow the refrigerant stored in the refrigerant storage unit 141 to flow out to the absorbent storage tank 44.

The spin coating body 41c is rotated in the membrane member 41b by a motor in the R1-direction via a rotation shaft. In the evaporator 41, as the spin coating body 41c rotates in the R1-direction, the refrigerant stored in the membrane member 41b is pumped up and uniformly supplied to the heat exchanger 41a. In addition, the liquid level measurement unit 41d measures a liquid level of the refrigerant storage unit 141 in the membrane member 41b. In addition, the liquid level measurement unit 41d is electrically connected to a control portion (not illustrated).

Absorber

The absorber 42 is configured to cause the refrigerant (low temperature water vapor) evaporated by the evaporator 41 to be absorbed into the concentrated absorbent separated from the diluted absorbent in the gas-liquid separation unit 51b. That is, the absorber 42 is configured to dilute the concentrated absorbent during the cooling operation.

Specifically, the absorber 42 includes a heat exchanger 42a, a membrane member 42b, a spin coating body 42c, a motor (not illustrated), a liquid level measurement unit 42d, and a pressure measurement unit 42e.

The heat exchanger 42a is configured so that the heat generated when the concentrated absorbent absorbs the refrigerant vapor is cooled with the cooling water. That is, the heat exchanger 42a exchanges the heat between the diluted absorbent and the cooling water. The heat exchanger 42a has a heat transfer pipe (not illustrated) through which cooling water flows. A plurality of (five) heat exchangers 42a are disposed to be aligned in the X-direction. The number of the heat exchangers 42a may be one to four, and six or more.

The membrane member 42b covers and surrounds the heat exchanger 42a, and is configured to cause the refrigerant vapor to be permeable without causing the diluted absorbent and the concentrated absorbent to be permeable. In this manner, an absorbent storage unit 142 that stores the diluted absorbent is formed in a lower portion of the membrane member 42b. The membrane member 42b surrounds and covers a structure in which the heat exchanger 42a and the spin coating body 42c are integrated. In addition, the inside of the membrane member 42b is held in a low-pressure vacuum state in order to fetch the refrigerant vapor evaporated in the evaporator 41 into the membrane member 42b. An outflow port 42f through which the diluted absorbent stored in the absorbent storage unit 142 flows out to the absorbent storage tank 44 is formed in a portion (lower portion) of the membrane member 42b on a side in the Z2-direction.

The spin coating body 42c is rotated via a rotation shaft inside the membrane member 42b by a motor in an R2-direction. In the absorber 42, as the spin coating body 42c rotates in the R2-direction, the diluted absorbent stored in the membrane member 42b is pumped up, and is uniformly supplied to the heat exchanger 42a. The liquid level measurement unit 42d measures a liquid level of the absorbent storage unit 142 inside the membrane member 42b. The pressure measurement unit 42e measures a pressure inside the membrane member 42b. In addition, the liquid level measurement unit 42d and the pressure measurement unit 42e are electrically connected to a control portion (not illustrated).

Absorption Evaporator Container

The absorption evaporator container 43 is a single container in which the absorber 42 and the evaporator 41 are internally disposed. The absorption evaporator container 43 surrounds and covers the absorber 42 and the evaporator 41. The inside of the absorption evaporator container 43 is held in a low-pressure vacuum state in accordance with the evaporator 41 and the absorber 42.

Absorbent Storage Tank

As illustrated in FIGS. 1 and 2, the absorbent storage tank 44 can store both the diluted absorbent discharged from the absorber 42 and the refrigerant discharged from the evaporator 41. The absorbent storage tank 44 has an absorbent storage unit 144 that stores the diluted absorbent. Specifically, the absorbent storage tank 44 is integrally provided in the Z2-direction of (below) both the absorber 42 and the evaporator 41, and communicates with both the absorber 42 and the evaporator 41. That is, the absorbent storage tank 44 is integrally provided on a surface 43a (lower surface 43a) of the absorption evaporator container 43 on a side in the Z2-direction. Specifically, the absorbent storage tank 44 is disposed at a position shifted to the absorber 42 side (side in the Y2-direction) of the lower surface 43a of the absorption evaporator container 43 in the Y-direction. In addition, the absorbent storage tank 44 communicates with a space inside the membrane member 41b of the evaporator 41, and communicates with a space inside the membrane member 42b of the absorber 42.

Specifically, the absorbent storage tank 44 has a first outflow passage 44a, a second outflow passage 44b, a third outflow passage 44c, the absorbent storage unit 144, and a discharge flow passage 44d.

The first outflow passage 44a connects the refrigerant storage unit 141 inside the membrane member 41b of the evaporator 41 and the absorbent storage unit 144 of the absorbent storage tank 44 to each other. An adjusting valve 44e for adjusting a flow rate of the refrigerant flowing through the first outflow passage 44a is disposed in the first outflow passage 44a. The second outflow passage 44b connects the absorbent storage unit 142 inside the membrane member 42b of the absorber 42 and the absorbent storage unit 144 of the absorbent storage tank 44 to each other. An electromagnetic valve 44f for adjusting a flow rate of the refrigerant flowing through the second outflow passage 44b is disposed in the second outflow passage 44b. The third outflow passage 44c connects the absorbent storage unit 142 inside the membrane member 42b of the absorber 42 and the pump 33a to each other. An electromagnetic valve 44g for adjusting a flow rate of the refrigerant flowing through the third outflow passage 44c is disposed in the third outflow passage 44c.

The diluted absorbent is stored in the absorbent storage unit 144. Here, the absorbent storage unit 144 is configured so that a drawing amount of the diluted absorbent and the refrigerant is changed in accordance with a liquid amount of the stored diluted absorbent.

Specifically, the pressure inside the absorbent storage unit 144 and the pressure inside the membrane member 41b of the evaporator 41 are substantially the same as each other, since the inside of the absorbent storage unit 144 and the inside of the membrane member 41b of the evaporator 41 communicate with each other via the first outflow passage 44a. In this manner, in the absorbent storage unit 144, the drawing amount of the refrigerant is changed in accordance with a head difference from the membrane member 41b of the evaporator 41. In addition, the pressure inside the absorbent storage unit 144 and the pressure inside the membrane member 42b of the absorber 42 are substantially the same as each other, since the inside of the absorbent storage unit 144 and inside of the membrane member 42b of the absorber 42 communicate with each other via the second outflow passage 44b. In this manner, in the absorbent storage unit 144, the drawing amount of the diluted absorbent is changed in accordance with a head difference from the membrane member 42b of the absorber 42.

The discharge flow passage 44d connects the absorbent storage unit 144 inside the absorbent storage tank 44 and the third outflow passage 44c to each other. An electromagnetic valve 44h for adjusting a flow rate of the refrigerant flowing through the discharge flow passage 44d is disposed in the discharge flow passage 44d.

Regeneration Condensation Unit

Figure 5:
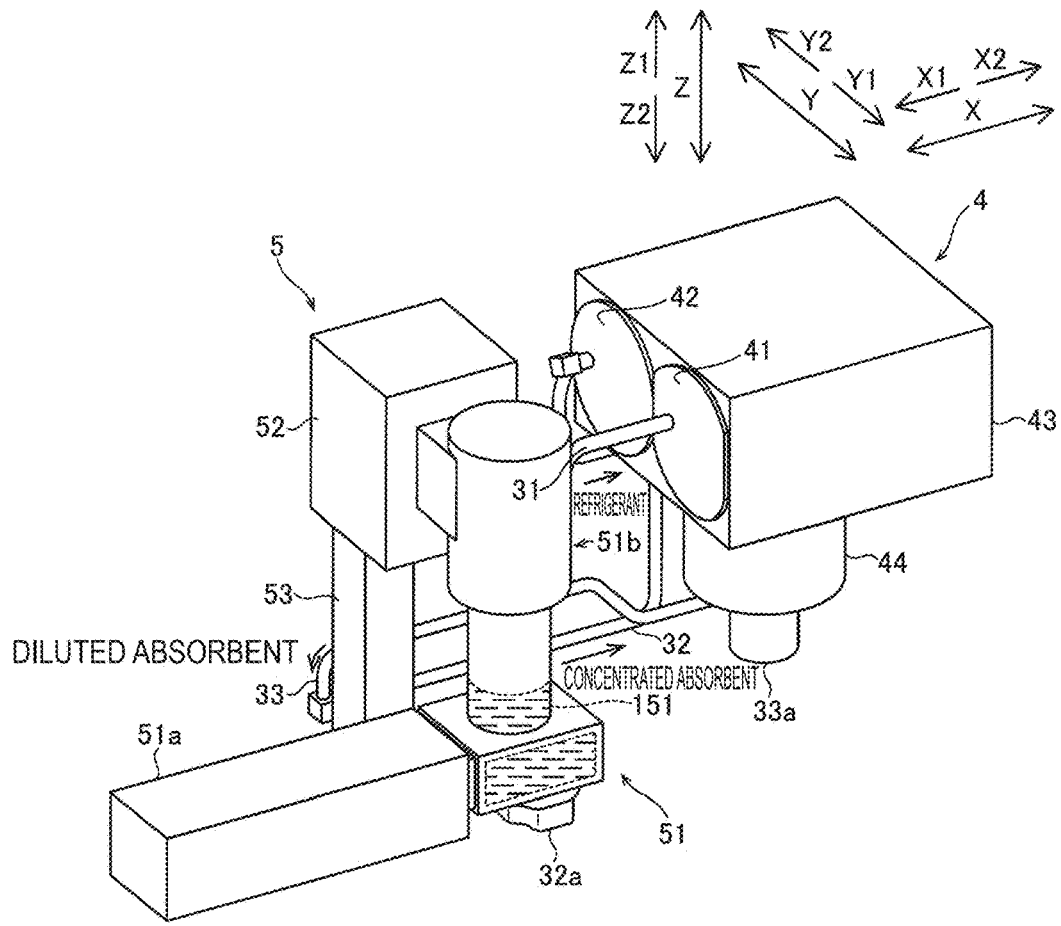
FIG. 5 is a perspective view when the regenerator, the condenser, the gas-liquid separation unit, and the absorption evaporator container in the in-vehicle absorption heat pump device according to the embodiment are viewed from a side in an X1-direction.

As illustrated in FIGS. 1 and 5, the regeneration condensation unit 5 is a unit in which the regenerator 51, the condenser 52, and the heat exchanger 53 are integrally provided. Specifically, the regeneration condensation unit 5 includes the regenerator 51, the condenser 52, and the heat exchanger 53.

Regenerator

The regenerator 51 includes the heating unit 51a and the gas-liquid separation unit 51b.

The heating unit 51a is a plate-type heat exchanger, and has a role of heating the diluted absorbent by using heat of exhaust gas of an engine. Here, the diluted absorbent normally flows through the heating unit 51a in a state where the concentrated absorbent is diluted with the refrigerant (water). The heating unit 51a has a high temperature and a high pressure by heating the diluted absorbent. Here, the heating unit 51a is provided integrally with the gas-liquid separation unit 51b. That is, the heating unit 51a is disposed below the gas-liquid separation unit 51b. The heating unit 51a is adjacent to a side in the X1-direction of an end portion on a side in the Z2-direction of the gas-liquid separation unit 51b.

The gas-liquid separation unit 51b is configured to separate the diluted absorbent containing the refrigerant into the refrigerant and the concentrated absorbent separated from the diluted absorbent. That is, the gas-liquid separation unit 51b has a function of separating and concentrating the refrigerant vapor (high temperature water vapor) from the diluted absorbent containing the refrigerant and the concentrated absorbent which are heated by the heating unit 51a. The gas-liquid separation unit 51b has an absorbent storage unit 151 (an example of a "storage unit" in the appended claims) that stores the separated concentrated absorbent. The absorbent storage unit 151 is a cylindrical space extending in the Z-direction. The absorbent storage unit 151 and the pump 32a communicate with each other.

Condenser

Figure 6:
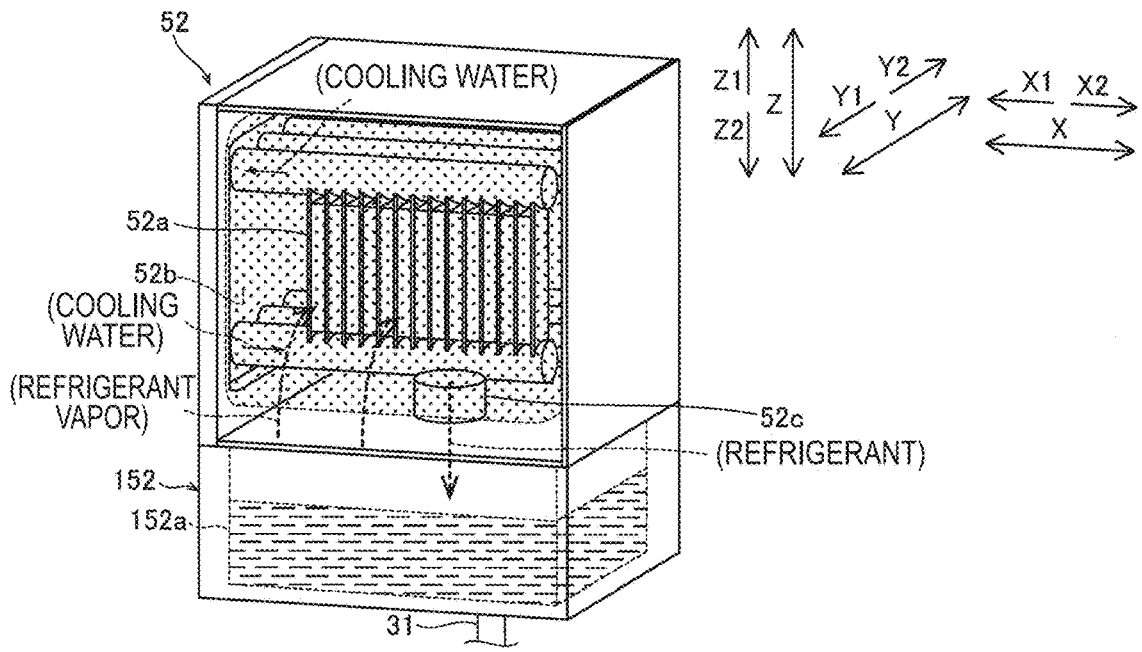
FIG. 6 is a perspective view illustrating the condenser in the in-vehicle absorption heat pump device according to the embodiment.

As illustrated in FIGS. 1 and 6, the condenser 52 is disposed adjacent to the gas-liquid separation unit 51b, and is configured to condense (liquefy) the refrigerant vapor separated in the gas-liquid separation unit 51b during the cooling operation. Specifically, the condenser 52 is disposed on a side in the Z1-direction from the heating unit 51a, and is disposed at a position shifted to a side in the Y2-direction with respect to the gas-liquid separation unit 51b in the Y-direction.

The condenser 52 has a heat exchanger 52a, a vapor permeable membrane 52b, an outflow pipe 52c, a refrigerant storage tank 152, a liquid level measurement unit 52d, and a pressure measurement unit 52e.

In the heat exchanger 52a, the refrigerant vapor is liquefied by heat exchange between the refrigerant vapor separated in the gas-liquid separation unit 51b and the cooling water flowing through the first cooling water circuit unit 1. The vapor permeable membrane 52b covers and surrounds the heat exchanger 52a, and is configured to cause the refrigerant vapor to be permeable without causing the diluted absorbent and the concentrated absorbent to be permeable. That is, the vapor permeable membrane 52b covers the heat exchanger 52a, and allows the refrigerant vapor to pass therethrough, but prevents the absorbent from passing therethrough.

The outflow pipe 52c causes a space inside the vapor permeable membrane 52b and the refrigerant storage tank 152 to communicate with each other. The refrigerant storage tank 152 is configured to store the refrigerant liquefied by the heat exchanger 52a of the condenser 52 and stored inside the vapor permeable membrane 52b. The refrigerant storage tank 152 has a refrigerant storage unit 152a that stores the refrigerant discharged from the outflow pipe 52c. The liquid level measurement unit 52d measures a liquid level of the refrigerant in the refrigerant storage unit 152a. The pressure measurement unit 52e measures a pressure inside the vapor permeable membrane 52b. In addition, the liquid level measurement unit 52d and the pressure measurement unit 52e are electrically connected to a control portion (not illustrated).

Heat Exchanger

Figure 3:
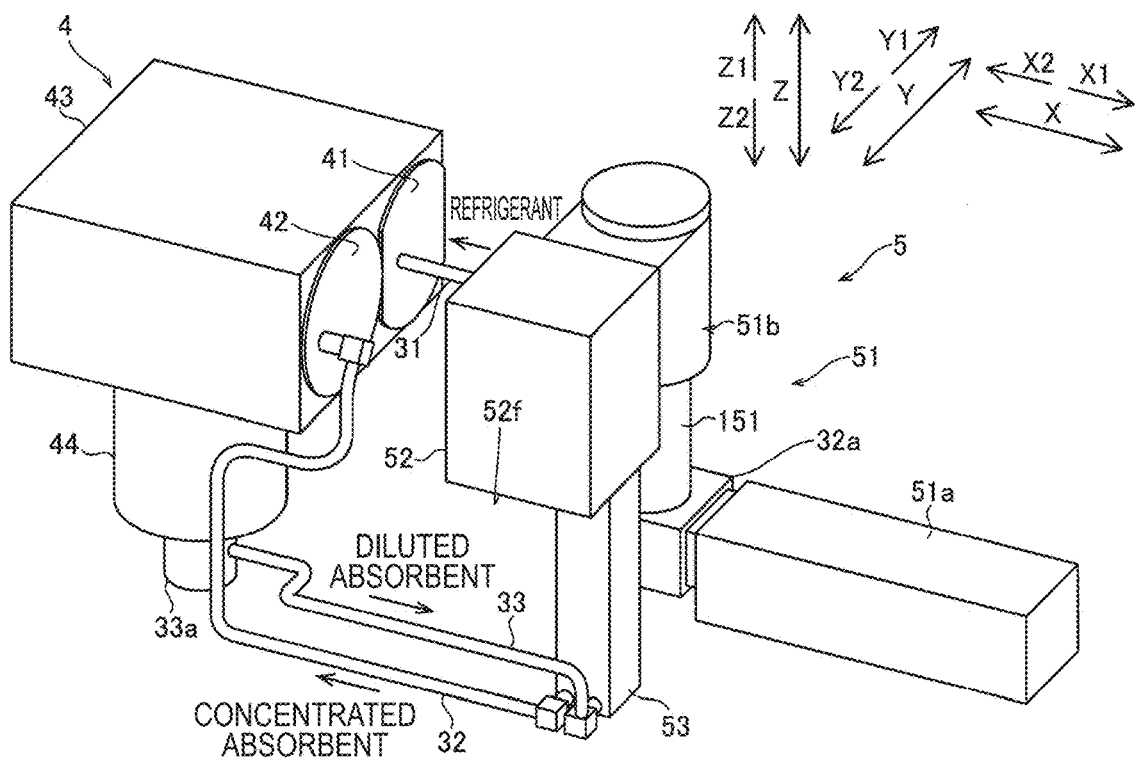
FIG. 3 is a perspective view when the regenerator, the condenser, the gas-liquid separation unit, and the absorption evaporator container in the in-vehicle absorption heat pump device according to the embodiment are viewed from a side in a Y2-direction.

As illustrated in FIGS. 1 and 3, the heat exchanger 53 cools the concentrated absorbent by heat exchange between the concentrated absorbent flowing through the first absorbent pipeline portion 32 and the diluted absorbent flowing through the second absorbent pipeline portion 33. The heat exchanger 53 is integrally provided on a surface 52f (lower surface 52f) on a side in the Z2-direction of the condenser 52. The heat exchanger 53 has a rectangular parallelepiped shape extending in the Z-direction.

Pump

As illustrated in FIGS. 1 and 2, the pump 32a is disposed on the upstream side of the branch portion 34a (branch portion to the second flow passage) in the first absorbent pipeline portion 32, and is configured to circulate the diluted absorbent inside the regenerator 51. That is, the pump 32a is disposed on the downstream side of the gas-liquid separation unit 51b, and is disposed on the upstream side of the branch pipeline portion 34. In addition, a portion of the concentrated absorbent discharged from the pump 32a flows through the first absorbent pipeline portion 32, and is supplied to the absorber 42. The remaining portion of the concentrated absorbent flows through the branch pipeline portion 34, and is supplied to the heating unit 51a. Here, a flow rate of the concentrated absorbent flowing through the first absorbent pipeline portion 32 is adjusted to a constant amount by the electromagnetic valve 32c. However, a flow rate of the concentrated absorbent flowing through the branch pipeline portion 34 is not adjusted by the electromagnetic valve, and the concentrated absorbent flows at an unchanged velocity.

Figure 7:
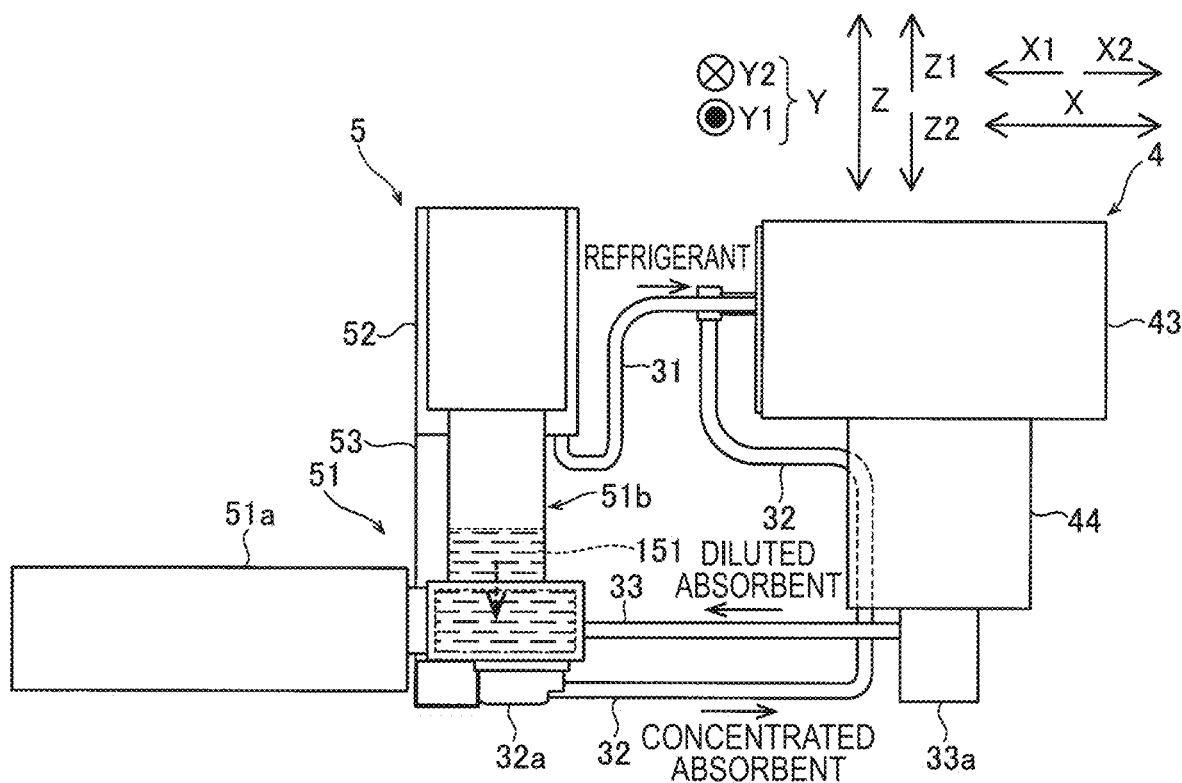
FIG. 7 is a side view when the regenerator, the condenser, the gas-liquid separation unit, and the absorption evaporator container in the in-vehicle absorption heat pump device according to the embodiment are viewed from a side in the Y1-direction.

As illustrated in FIGS. 1 and 7, the pump 32a is disposed on the downstream side of the absorbent storage unit 151, and is integrally provided on the surface 51c (lower surface 51c) on a side in the Z2-direction of the gas-liquid separation unit 51b. That is, the pump 32a is configured to directly suction the concentrated absorbent inside the absorbent storage unit 151 of the gas-liquid separation unit 51b. The pump 32a is configured to suction the concentrated absorbent in a state where a load of the concentrated absorbent inside the absorbent storage unit 151 is applied. The pump 32a is adjacent to a side in the Z2-direction of the gas-liquid separation unit 51b. In this way, the absorbent storage unit 151 is a buffer space of the pump 32a.

Reduced Portion

Figure 8:
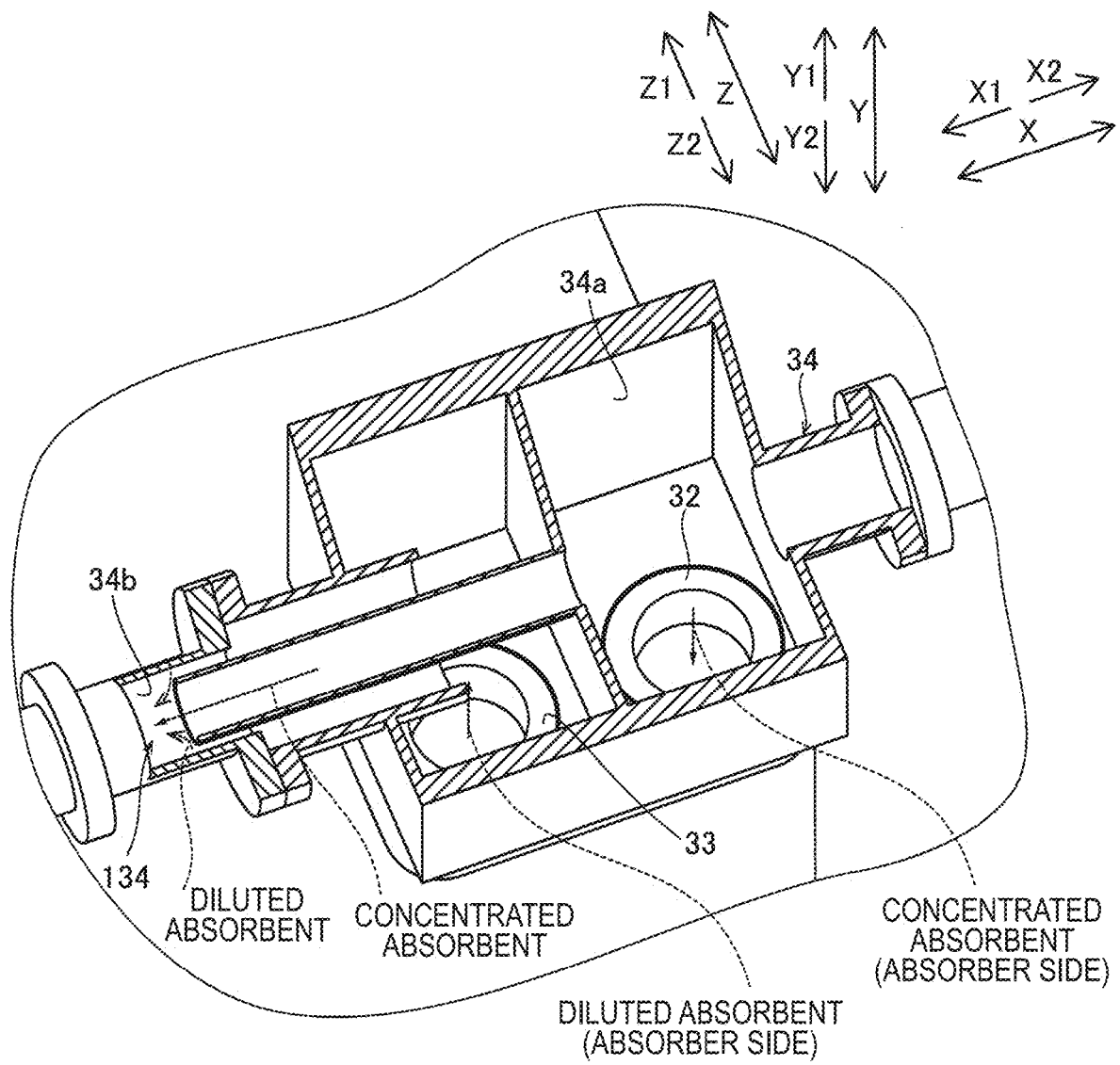
FIG. 8 is an enlarged sectional view of a part A in FIG. 2.

As illustrated in FIGS. 1 and 8, the branch pipeline portion 34 has a reduced portion 134 having a flow passage cross-sectional area smaller than that of other portions in the merging portion 34b with the second absorbent pipeline portion 33, and to which a downstream end portion of the second absorbent pipeline portion 33 is connected. The reduced portion 134 assists an operation by drawing the diluted absorbent flowing into the branch pipeline portion 34 from the second absorbent pipeline portion 33. In this manner, the reduced portion 134 causes the diluted absorbent to smoothly flow into the branch pipeline portion 34.

Specifically, the reduced portion 134 is configured to include an ejector provided in the merging portion 34b of the branch pipeline portion 34. That is, the reduced portion 134 is configured to draw the diluted absorbent of the second absorbent pipeline portion 33 into the branch pipeline portion 34 by using a negative pressure generated by the concentrated absorbent flowing through the reduced portion 134.

Disposition of Evaporation Absorption Unit and Regeneration Condensation Unit

As illustrated in FIGS. 2 and 3, the evaporation absorption unit 4 and the regeneration condensation unit 5 face each other in the X-direction. That is, the absorption evaporator container 43 and the condenser 52 face each other in the XY-direction (horizontal direction).

Here, the absorber 42 and the evaporator 41 are integrally provided adjacent to each other in the XY-direction (horizontal direction). Specifically, the absorber 42 and the evaporator 41 are disposed adjacent to each other in the Y-direction inside the absorption evaporator container 43. In addition, the condenser 52 and the gas-liquid separation unit 51b are disposed adjacent to each other in the XY-direction (horizontal direction). Specifically, the condenser 52 and the gas-liquid separation unit 51b are integrally attached adjacent to each other in the Y-direction. In this way, the absorber 42 and the evaporator 41, and the condenser 52 and the gas-liquid separation unit 51b face each other in the XY-direction (horizontal direction).

Advantageous Effects of Present Embodiment

In the present embodiment, the following advantageous effects can be achieved.

In the present embodiment, as described above, the in-vehicle absorption heat pump device 100 has the absorbent storage tank 44 that can store both the diluted absorbent discharged from the absorber 42 and the refrigerant discharged from the evaporator 41. The absorbent storage tank 44 is integrally provided in the Z2-direction of (below) both the absorber 42 and the evaporator 41, and communicates with both the absorber 42 and the evaporator 41. In this manner, the pressure inside the absorber 42, the pressure inside the evaporator 41, and the pressure inside the absorbent storage tank 44 can be substantially the same as each other. Accordingly, the pressure inside the absorbent storage tank 44 can be changed in accordance with the amount of the diluted absorbent stored inside the absorbent storage tank 44. Therefore, without providing a drive source such as the pump for discharging the concentrated absorbent mixed with the refrigerant from the inside the evaporator 41, the diluted absorbent can be discharged from the absorber 42, and the mixed concentrated absorbent can be discharged from the evaporator 41. As a result, performance of the evaporator 41 can be ensured while decreasing a size of the in-vehicle absorption heat pump device 100. In addition, the absorbent storage tank 44 is integrally provided in the Z2-direction of (below) both the absorber 42 and the evaporator 41. In this manner, compared to a case where the absorbent storage tank 44 is provided separately from the absorber 42, it is possible to eliminate or shorten a pipe disposed between the absorber 42 and the absorbent storage tank 44 and a pipe disposed between the evaporator 41 and the absorbent storage tank 44. Accordingly, it is possible to decrease a size of the in-vehicle absorption heat pump device 100.

In addition, in the present embodiment, as described above, the in-vehicle absorption heat pump device 100 has the single absorption evaporator container 43 in which the absorber 42 and the evaporator 41 are internally disposed. The absorbent storage tank 44 is integrally provided on the surface 43a (lower surface 43a) on the side in the Z2-direction of the absorption evaporator container 43. In this manner, the absorbent storage tank 44 is integrally provided on the surface 43a (lower surface 43a) on the side in the Z2-direction of the absorption evaporator container 43. In this manner, it is possible to eliminate or shorten the pipe disposed between the absorber 42 and the absorbent storage tank 44 and the pipe disposed between the evaporator 41 and the absorbent storage tank 44. Accordingly, it is possible to decrease a size of a unit including the evaporator 41, the absorber 42, and the absorbent storage tank 44.

In addition, in the present embodiment, as described above, the absorption evaporator container 43 and the condenser 52 face each other in the XY-direction (horizontal direction). In this manner, compared to a case where the absorption evaporator container 43 and the condenser 52 are disposed to be shifted from each other in the z-direction, a size (dimension) of the in-vehicle absorption heat pump device 100 in the upward-downward direction can be decreased. Accordingly, it is possible to prevent a size increase and a complicated configuration of the in-vehicle absorption heat pump device 100.

In addition, in the present embodiment, as described above, the in-vehicle absorption heat pump device 100 has the first cooling water circuit unit 1 through which the cooling water flows. The condenser 52 has the heat exchanger 52a in which heat exchange is performed between the refrigerant vapor separated in the gas-liquid separation unit 51b and the cooling water flowing through the first cooling water circuit unit 1, and the vapor permeable membrane 52b covering the heat exchanger 52a, through which the refrigerant vapor is allowed to pass, and through which the absorbent is prevented from passing. In this manner, the vapor permeable membrane 52b provides a configuration in which the concentrated absorbent separated in the gas-liquid separation unit 51b is less likely to mix with the refrigerant condensed in the heat exchanger 52a. Accordingly, it is possible to more reliably prevent the concentrated absorbent from flowing into the evaporator 41. As a result, it is possible to suppress performance degradation of the evaporator 41 caused when the concentrated absorbent inside the gas-liquid separation unit 51b is mixed with the condensed refrigerant, flows into the evaporator 41 as it is, and remains inside the evaporator 41 without being evaporated.

In addition, in the present embodiment, as described above, the in-vehicle absorption heat pump device 100 has the first absorbent pipeline portion 32 through which the concentrated absorbent separated in the gas-liquid separation unit 51b flows to the heating unit 51a, the branch pipeline portion 34 branching from the first absorbent pipeline portion 32, and through which the concentrated absorbent separated in the gas-liquid separation unit 51b flows to the absorber 42, and the pump 32a disposed on the upstream side of the branch portion 34a to the branch pipeline portion 34 in the first absorbent pipeline portion 32, and circulating the concentrated absorbent inside the regenerator 51. In this manner, compared to a case where the pump 32a is disposed on the downstream side of the branch portion 34a to the branch pipeline portion 34 in the first absorbent pipeline portion 32, a flow rate of the concentrated absorbent discharged from the pump 32a is less likely to be biased to the first absorbent pipeline portion 32. Accordingly, the concentrated absorbent discharged from the pump 32a can be distributed to each of the first absorbent pipeline portion 32 and the branch pipeline portion 34 at a more proper flow rate. As a result, the diluted absorbent stored inside the absorber 42 can be easily maintained at a constant amount.

In addition, in the present embodiment, as described above, the absorbent storage unit 151 that stores the separated concentrated absorbent is provided in the gas-liquid separation unit 51b. The pump 32a is disposed on the downstream side of the absorbent storage unit 151, and is integrally provided on the surface 51c (lower surface 51c) on the side in the Z2-direction of the gas-liquid separation unit 51b. In this manner, the concentrated absorbent can be pressurized by the self-weight of the concentrated absorbent stored in the absorbent storage unit 151. Accordingly, it is possible to prevent bubbles contained in the concentrated absorbent from being deposited inside the pump 32a. As a result, it is possible to prevent cavitation from occurring inside the pump 32a. In addition, due to the self-weight of the concentrated absorbent stored in the absorbent storage unit 151, the concentrated absorbent easily flow to the pump 32a from the absorbent storage unit 151. Accordingly, the concentrated absorbent can be efficiently suctioned by the pump 32a. In addition, the pump 32a suctions the concentrated absorbent stored in the absorbent storage unit 151. In this manner, the pump 32a can more reliably suction the concentrated absorbent. Accordingly, it is possible to prevent idling of the pump 32a.

In addition, in the present embodiment, as described above, the branch pipeline portion 34 has the reduced portion 134 having a flow passage cross-sectional area smaller than that of other portions in the merging portion 34b with the second absorbent pipeline portion 33, and to which the downstream end portion of the second absorbent pipeline portion 33 is connected. The reduced portion 134 is configured to draw the diluted absorbent of the second absorbent pipeline portion 33 into the branch pipeline portion 34 due to a negative pressure generated by the concentrated absorbent flowing through the reduced portion 134. In this manner, the diluted absorbent of the second absorbent pipeline portion 33 is drawn into the branch pipeline portion 34 by the reduced portion 134. In this manner, it is possible to adopt a configuration in which a flow of the diluted absorbent in the second absorbent pipeline portion 33 is less likely to hinder a flow of the concentrated absorbent in the first absorbent pipeline portion 32. Accordingly, it is possible to prevent sudden fluctuations in the flow rate of the diluted absorbent supplied to the heating unit 51a. As a result, the flow rate of the diluted absorbent supplied to the heating unit 51a can be easily maintained at a constant amount.

Modification Examples

It should be considered that the embodiments disclosed here are merely examples and are not restrictive at all. The scope of the present disclosure is presented by the appended claims, instead of the above-described embodiments, and further includes all changes (modification examples) within the meaning and the scope which are equivalent to those of the appended claims.

For example, in the above-described embodiment, an example has been described in which the absorbent storage tank 44 is integrally provided on the surface 43a (lower surface 43a) on the side in the Z2-direction of the absorption evaporator container 43. However, the present disclosure is not limited thereto. In the present disclosure, the absorbent storage tank may be integrally provided in a portion below both the absorber and the evaporator, on a side surface of the absorption evaporator container.

In addition, in the above-described embodiment, an example has been described in which the absorption evaporator container 43 and the condenser 52 face each other in the XY-direction (horizontal direction). However, the present disclosure is not limited thereto. In the present disclosure, the absorption evaporator container and the condenser may be disposed at positions shifted in the upward-downward direction.

In addition, in the above-described embodiment, an example has been described in which the condenser 52 has the heat exchanger 52a and the vapor permeable membrane 52b. However, the present disclosure is not limited thereto. In the present disclosure, only the heat exchanger may be disposed inside the condenser, without covering the heat exchanger with the vapor permeable membrane.

In addition, in the above-described embodiment, an example has been described in which the pump 32a is disposed on the upstream side of the branch portion 34a. However, the present disclosure is not limited thereto. In the present disclosure, the pump may be disposed on the downstream side of the branch portion.

In addition, in the above-described embodiment, an example has been described in which the pump 32a is disposed on the downstream side of the absorbent storage unit 151 (storage unit), and is integrally provided on the surface 51c (lower surface 51c) on the side in the Z2-direction of the gas-liquid separation unit 51b. However, the present disclosure is not limited thereto. In the present disclosure, the pump may be disposed on the downstream side of the storage unit, and may be integrally disposed on a side surface other than the lower surface of the gas-liquid separation unit.

In addition, in the above-described embodiment, an example has been described in which the branch pipeline portion 34 (second flow passage) has the reduced portion 134. However, the present disclosure is not limited thereto. In the present disclosure, the second flow passage may not have the reduced portion.

An in-vehicle absorption heat pump device according to an aspect of this disclosure includes a regenerator including a gas-liquid separation unit that separates a diluted absorbent containing a refrigerant into the refrigerant and a concentrated absorbent separated from the diluted absorbent, a condenser that condenses a refrigerant vapor separated from the diluted absorbent in the gas-liquid separation unit, an evaporator that evaporates the refrigerant condensed in the condenser, an absorber that causes the refrigerant evaporated by the evaporator to be absorbed into the concentrated absorbent separated from the diluted absorbent in the gas-liquid separation unit, and a storage tank that stores both the diluted absorbent discharged from the absorber and the refrigerant discharged from the evaporator. The storage tank is integrally provided below both the absorber and the evaporator, and communicates with both the absorber and the evaporator.

In the in-vehicle absorption heat pump device according to the aspect of this disclosure, as described above, there is provided the storage tank that can store both the diluted absorbent discharged from the absorber and the refrigerant discharged from the evaporator. The storage tank is integrally provided below both the absorber and the evaporator, and communicates with both the absorber and the evaporator. In this manner, a pressure inside the absorber, a pressure inside the evaporator, and a pressure inside the storage tank can be substantially the same as each other. Accordingly, the pressure inside the storage tank can be changed in accordance with the amount of the diluted absorbent stored inside the storage tank. Therefore, without providing a drive source such as a pump for discharging the concentrated absorbent mixed with the refrigerant from the inside the evaporator, the diluted absorbent can be discharged from the absorber, and the mixed concentrated absorbent can be discharged from the evaporator. As a result, performance of the evaporator can be ensured while decreasing a size of the in-vehicle absorption heat pump device. In addition, the storage tank is integrally provided below both the absorber and the evaporator. In this manner, compared to a case where the storage tank is provided separately from the absorber, it is possible to eliminate or shorten a pipe disposed between the absorber and the storage tank and a pipe disposed between the evaporator and the storage tank. In this manner, the size of the in-vehicle absorption heat pump device can be further decreased.

It is preferable that the in-vehicle absorption heat pump device according to the aspect further includes a single absorption evaporator container in which the absorber and the evaporator are internally disposed, and the storage tank is integrally provided on a lower surface of the absorption evaporator container.

According to this configuration, the storage tank is integrally provided on the lower surface of the absorption evaporator container. In this manner, it is possible to eliminate or shorten the pipe disposed between the absorber and the storage tank and the pipe disposed between the evaporator and the storage tank. Accordingly, it is possible to decrease a size of a unit including the evaporator, the absorber, and the storage tank.

In this case, it is preferable that the absorption evaporator container and the condenser face each other in a horizontal direction.

According to this configuration, compared to a case where the absorption evaporator container and the condenser are disposed to be shifted from each other in an upward-downward direction, a size (dimension) of the in-vehicle absorption heat pump device in the upward-downward direction can be decreased. Accordingly, it is possible to prevent a size increase and a complicated configuration of the in-vehicle absorption heat pump device.

It is preferable that the in-vehicle absorption heat pump device according to the aspect further includes a cooling water circuit through which cooling water flows, and the condenser includes a heat exchanger in which heat exchange is performed between the refrigerant vapor separated in the gas-liquid separation unit and the cooling water flowing through the cooling water circuit, and a vapor permeable membrane covering the heat exchanger, through which the refrigerant vapor is allowed to pass, and through which the absorbent is prevented from passing.

According to this configuration, the vapor permeable membrane provides a configuration in which the concentrated absorbent separated in the gas-liquid separation unit is less likely to mix with the refrigerant condensed in the heat exchanger. Accordingly, it is possible to more reliably prevent the concentrated absorbent from flowing into the evaporator. As a result, it is possible to suppress performance degradation of the evaporator caused when the concentrated absorbent inside the gas-liquid separation unit is mixed with the condensed refrigerant, flows into the evaporator as it is, and remains inside the evaporator without being evaporated.

In-vehicle absorption heat pump device according to the aspect, it is preferable that the regenerator further includes a heating unit that heats the diluted absorbent, and the in-vehicle absorption heat pump device further includes a first flow passage through which the concentrated absorbent separated in the gas-liquid separation unit flows to the absorber, a second flow passage branching from the first flow passage, and through which the concentrated absorbent separated in the gas-liquid separation unit flows to the heating unit, and a pump disposed on an upstream side of a branch portion to the second flow passage in the first flow passage, and circulating the concentrated absorbent inside the regenerator.

According to this configuration, compared to a case where the pump is disposed on a downstream side of the branch portion to the second flow passage in the first flow passage, a flow rate of the concentrated absorbent discharged from the pump is less likely to be biased to the first flow passage. Accordingly, the concentrated absorbent discharged from the pump can be distributed to each of the first flow passage and the second flow passage at a more proper flow rate. As a result, the diluted absorbent stored inside the absorber can be easily maintained at a constant amount.

In this case, it is preferable that the gas-liquid separation unit includes a storage unit that stores the separated concentrated absorbent, and the pump is disposed on a downstream side of the storage unit, and may be integrally provided on a lower surface of the gas-liquid separation unit.

According to this configuration, the concentrated absorbent can be pressurized by a self-weight of the concentrated absorbent stored in the storage unit. Accordingly, it is possible to prevent bubbles contained in the concentrated absorbent from being deposited inside the pump. As a result, it is possible to prevent cavitation from occurring inside the pump. In addition, due to the self-weight of the concentrated absorbent stored in the storage unit, the concentrated absorbent easily flows to the pump from the storage unit. Accordingly, the concentrated absorbent can be efficiently suctioned by the pump. In addition, the pump suctions the concentrated absorbent stored in the storage unit. In this manner, the pump can more reliably suction the concentrated absorbent. Accordingly, it is possible to prevent idling of the pump.

It is preferable that the in-vehicle absorption heat pump device including the first flow passage further includes a third flow passage through which the diluted absorbent absorbing the refrigerant in the absorber flows to the second flow passage, the second flow passage has, in a merging portion with the third flow passage, a reduced portion having a flow passage cross-sectional area smaller than that of other portions, and to which a downstream end portion of the third flow passage is connected, and the reduced portion is configured so that the diluted absorbent of the third flow passage is drawn into the second flow passage due to a negative pressure generated by the concentrated absorbent flowing through the reduced portion.

According to this configuration, the diluted absorbent of the third flow passage is drawn into the second flow passage by the reduced portion. In this manner, it is possible to adopt a configuration in which a flow of the diluted absorbent in the third flow passage is less likely to hinder a flow of the concentrated absorbent in the first flow passage. Accordingly, it is possible to prevent sudden fluctuations in the flow rate of the diluted absorbent supplied to the heating unit. As a result, the flow rate of the diluted absorbent supplied to the heating unit can be easily maintained at a constant amount.

In the in-vehicle absorption heat pump device according to the above aspect, the following configuration is also conceivable.

Appendix 1

That is, in the in-vehicle absorption heat pump device according to the aspect, the absorber and the evaporator are integrally provided adjacent to each other in the horizontal direction. The condenser and the gas-liquid separation unit are disposed adjacent to each other in the horizontal direction. The absorber and the evaporator, and the condenser and the gas-liquid separation unit face each other in the horizontal direction.

According to this configuration, the absorber and the evaporator are integrally provided adjacent to each other in the horizontal direction. In this manner, it is possible to reduce a space needed to dispose the absorber and the evaporator in the horizontal direction. In addition, the condenser and the gas-liquid separation unit are disposed adjacent to each other in the horizontal direction. In this manner, it is possible to reduce a space needed to dispose the condenser and the gas-liquid separation unit in the horizontal direction. In addition, the absorber and the evaporator, and the condenser and the gas-liquid separation unit are caused to face each other in the horizontal direction. In this manner, compared to a case where the absorber and the evaporator, and the condenser and the gas-liquid separation unit are disposed to be shifted from each other in the upward-downward direction, the size (dimension) of the in-vehicle absorption heat pump device in the upward-downward direction can be decreased. As a result, the size (dimension) of the in-vehicle absorption heat pump device in the upward-downward direction and the horizontal direction can be decreased. Accordingly, it is possible to prevent a size increase and a complicated configuration of the in-vehicle absorption heat pump device.

Appendix 2

In the in-vehicle absorption heat pump device including the heating unit, the heating unit is disposed below the gas-liquid separation unit.

According to this configuration, the heating unit is disposed below the gas-liquid separation unit. In this manner, the heating unit has a high temperature and a high pressure, and the gas-liquid separation unit has a lower pressure than the heating unit. Accordingly, the diluted absorbent can be efficiently supplied to the gas-liquid separation unit. As a result, the in-vehicle absorption heat pump device can be efficiently operated, and it is possible to prevent a size (dimension) increase in the in-vehicle absorption heat pump device in the horizontal direction.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An in-vehicle absorption heat pump device comprising:
a regenerator including a gas-liquid separation unit that separates a diluted absorbent containing a refrigerant into the refrigerant and a concentrated absorbent separated from the diluted absorbent, and a heater that heats the diluted absorbent;
a condenser that condenses a refrigerant vapor separated from the diluted absorbent in the gas-liquid separation unit;
an evaporator that evaporates the refrigerant condensed in the condenser;
an absorber that causes the refrigerant evaporated by the evaporator to be absorbed into the concentrated absorbent separated from the diluted absorbent in the gas-liquid separation unit;
a first flow passage through which the concentrated absorbent separated in the gas-liquid separation unit flows to the absorber;
a second flow passage branching from the first flow passage, and through which the concentrated absorbent separated in the gas-liquid separation unit flows to the heater;
a pump disposed on an upstream side of a branch portion to the second flow passage in the first flow passage, and circulating the concentrated absorbent inside the regenerator; and
a storage tank that stores both the diluted absorbent discharged from the absorber and the refrigerant discharged from the evaporator, wherein
the storage tank is integrally provided below both the absorber and the evaporator, and communicates with both the absorber and the evaporator.

2. The in-vehicle absorption heat pump device according to claim 1, further comprising:
a single absorption evaporator container in which the absorber and the evaporator are internally disposed, wherein
the storage tank is integrally provided on a lower surface of the absorption evaporator container.

3. The in-vehicle absorption heat pump device according to claim 2, wherein
the absorption evaporator container and the condenser face each other in a horizontal direction.

4. The in-vehicle absorption heat pump device according to claim 1, further comprising:
a cooling water circuit through which cooling water flows, wherein
the condenser includes
a heat exchanger in which heat exchange is performed between the refrigerant vapor separated in the gas-liquid separation unit and the cooling water flowing through the cooling water circuit, and
a vapor permeable membrane covering the heat exchanger, through which the refrigerant vapor is allowed to pass, and through which the absorbent is prevented from passing.

5. The in-vehicle absorption heat pump device according to claim 1, wherein
the gas-liquid separation unit includes a storage unit that stores the separated concentrated absorbent, and
the pump is disposed on a downstream side of the storage unit, and is integrally provided on a lower surface of the gas-liquid separation unit.

6. The in-vehicle absorption heat pump device according to claim 1, further comprising:
a third flow passage through which the diluted absorbent absorbing the refrigerant in the absorber flows to the second flow passage, wherein
the second flow passage has, in a merging portion with the third flow passage, a reduced portion having a flow passage cross-sectional area smaller than that of other portions, and to which a downstream end portion of the third flow passage is connected, and
the reduced portion is configured so that the diluted absorbent of the third flow passage is drawn into the second flow passage due to a negative pressure generated by the concentrated absorbent flowing through the reduced portion.

* * * * *